United States Patent [19]
Braun et al.

[11] Patent Number: 5,020,308
[45] Date of Patent: Jun. 4, 1991

[54] SELF-PROPELLED STEERABLE WALK BEHIND MOWER LINKAGE

[75] Inventors: Stephen A. Braun, Horicon; Michael J. O'Neill, Mayville; David C. Polak, Beaver Dam, all of Wis.; Donald L. Cutshall, Burnsville, Minn.

[73] Assignee: Deere & Company, Moline, Ill.

[21] Appl. No.: 491,779

[22] Filed: Mar. 12, 1990

[51] Int. Cl.⁵ ............................................. A01D 34/82
[52] U.S. Cl. ..................................... 56/11.3; 56/11.5; 56/11.6; 56/DIG. 6; 180/19.3
[58] Field of Search ...................... 56/11.3, 11.5, 11.6, 56/11.7, 13.5, DIG. 6; 192/11, 12 R, 17 R; 180/19.3, 19.1

[56] References Cited

U.S. PATENT DOCUMENTS

| | | | |
|---|---|---|---|
| 4,476,643 | 10/1984 | Hilchey et al. | 180/19.3 |
| 4,493,180 | 1/1985 | Wick | 56/11.3 |
| 4,558,558 | 12/1985 | Horner, Jr. et al. | 56/11.3 |
| 4,667,459 | 5/1987 | Scanland et al. | 180/19.3 |

OTHER PUBLICATIONS

Woods Compnay, "Woods Commercial Walk-Behind Mowers", pp. 1-6, Published in U.S.A. at least by Sep. 27, 1989.
Ferris Industries, "Ferris Pro-Cut Commercial Mowers", pp. 1-4, Published in U.S.A. at least by Jul. 25, 1988.
Ransomes, Inc., "Ransomes Bob-Cat Mid-Size Mower Brochure", pp. 1-4, Published in U.S.A. at least by Jul. 27, 1988.
Cub Cadet Power Equipment Company, "1989 Cub Cadet Commerical Mowers", pp. 1-6, Published in U.S.A. at Least by Jul. 25, 1988.

Primary Examiner—Terry Lee Melius

[57] ABSTRACT

A mower control linkage having a double ended dead man control lever, left and right steering control levers, and a linkage interconnecting said levers with left and right transmission mechanisms. The linkage has swingable left and right are members that adjust the transmission mechanisms between braked, clutch disengaged and driven modes. The arm members arm connected to the dead man control lever via a lost motion coupling and are each linked with respective steering control levers. As the dead man control lever is depressed, both arm members are placed in a driven mode, and either steering control lever can then be depressed to shift the respective arm member to its braked mode to execute a turn about that wheel.

22 Claims, 5 Drawing Sheets

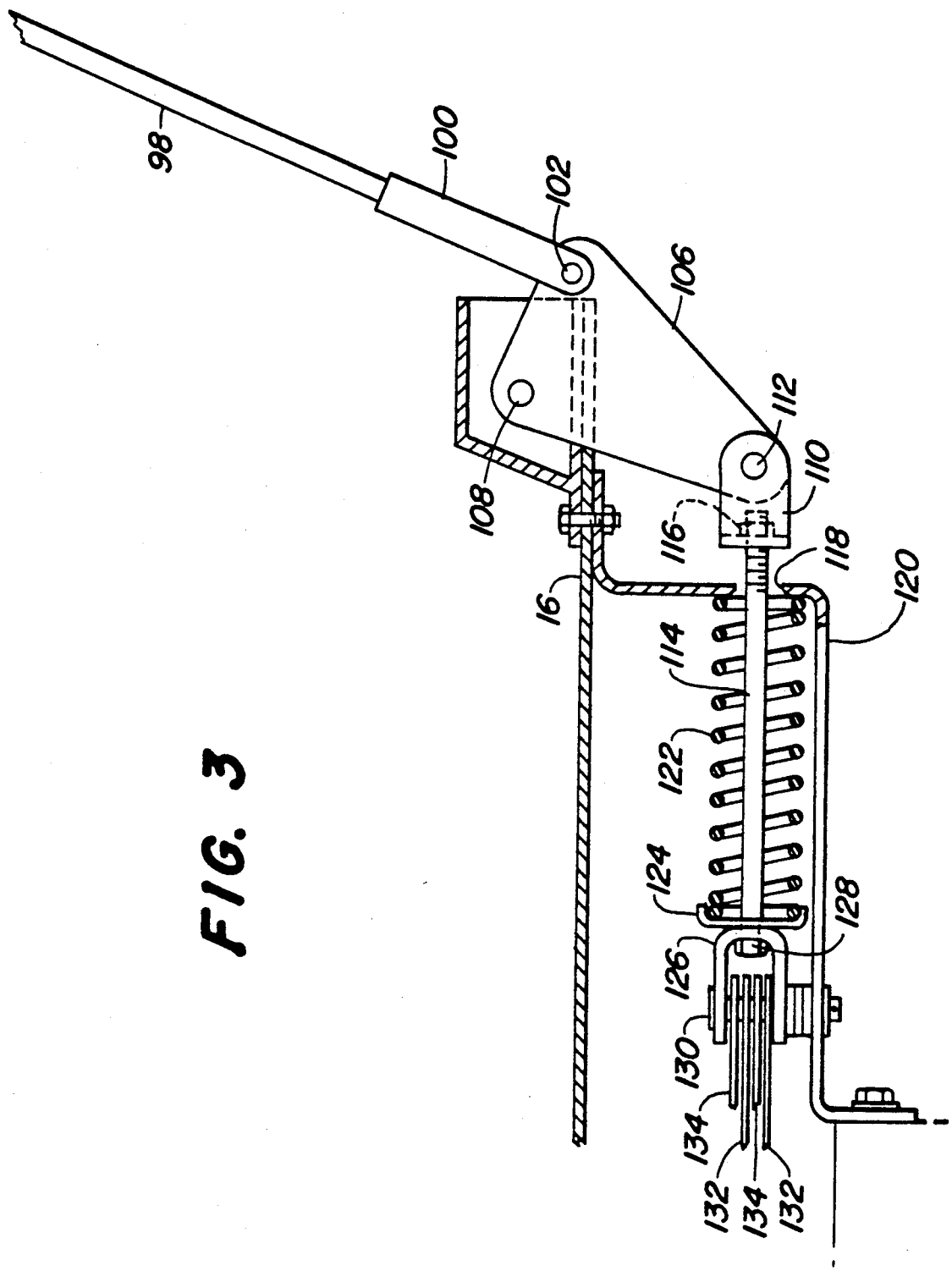

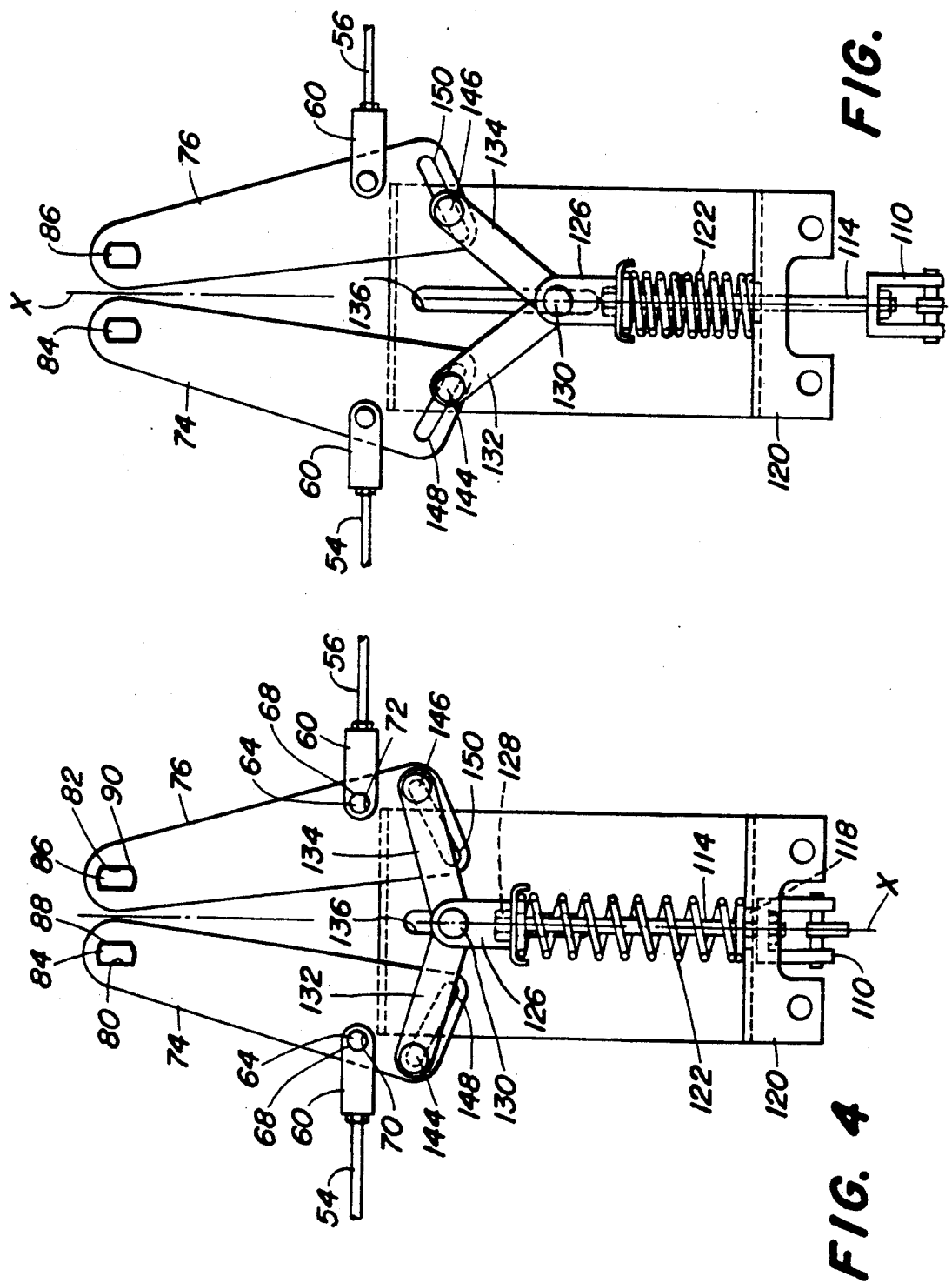

SELF-PROPELLED STEERABLE WALK BEHIND MOWER LINKAGE

BACKGROUND OF THE INVENTION

1. Field of the Invention

The invention relates to a steering and safety linkage for a self-propelled walk behind mower.

2. Description of the Prior Art

Conventional wide area self-propelled walk behind mowers typically contain a front mower deck, non-driven front caster wheels, a power source such as an engine or motor, and two ground engaging rear wheels driven by the power source. The operator steers the mower by one of the driven rear wheels. For example, if a brake were applied to the left rear driven wheel or its drive were disengaged, the mower would change its direction of travel to the left, and would change its direction of travel to the right if a brake were applied to the right rear wheel or its drive were declutched. The operator applies the brake and/or clutch to the wheels by manipulating respective steering control levers mounted on the operator handles located at the rear of the mower.

A first type of conventional self propelled walk behind mower provides for the rear wheels to be engaged during operation unless the operator actuates one of the wheel control levers to declutch or brake the respective wheel. With this type of mower control, the operator walks behind the mower as it propels itself forward, and he engages the left or right steering lever when he desires to change the direction of travel. When one of the steering levers is engaged, its respective wheel is thereby caused to be declutched, or declutched and braked. The mower turns about the wheel being declutched and/or braked. Since the wheel drives are in a driving mode when the steering levers are released, the operator must lock them out of their engaged position by locking devices positioned on the operator handles near the steering levers in order to start the mower. Once the mower is started, the operator can then release the locks and gradually release the steering levers to initiate forward progress of the mower. To stop the progress of the mower the operator must engage both steering levers simultaneously, thereby braking both rear wheels. To park the mower, the operator applies the locking devices to the steering levers once they have been positioned in a declutched and/or braked configuration. The mower will then remain declutched and/or braked if the operator leaves the vehicle. If the operator were to start the mower without first applying the locking devices to the controls, the controls would be in their driven mode and the wheels would begin to proceed forward once started. Some mowers of this type are provided with an electrical starter switch that prevents the engine from being started while in a driving mode.

It is known to modify the above described mower by including a speed select lever between the operator handles that has a neutral setting and a plurality of driving speed settings. The speed select lever controls whether the shaft that transfers power to the wheels is in a neutral mode wherein the engine is not driving the shaft, or in a driven mode wherein the engine is driving the shaft via a set of gears. The operator places the speed selector in its neutral setting when starting the engine. To initiate forward movement of the mower, the operator shifts the speed selector to a setting corresponding to a desired speed. If the locking devices are engaged when the speed selector has been shifted, then the operator must disengage the locking devices and slowly release the wheel control levers to initiate forward movement. The operator depresses the respective wheel control lever during operation to execute a turn. In order to stop the mower's movement, the operator must either actuate both wheel control levers simultaneously or shift the speed selector to the neutral setting, which will allow the mower to coast to a stop. It is also known to include on such mowers an electrical switch mechanism that runs between the speed select lever and the engine that prevents the engine from being started when the speed select lever is not in the neutral position.

A second type of conventional mower provides a single transversely extending pivotable bar that controls the driving and braking of each rear wheel. As the operator pushes forward on the control bar the rear wheel drives are engaged and the mower moves forward. As the operator pulls back on the control bar, the wheel drives are declutched and then braked. When the operator pivots the left or right side of the bar backwardly, the corresponding rear wheel becomes disengaged while the other wheel continues to be driven to turn the mower about the disengaged wheel. As the operator pulls back further on that side of the bar, the corresponding wheel becomes braked and the mower executes an even sharper turn about that wheel. When the operator releases the bar, both wheels become disengaged and the mower coasts to a stop. To brake the mower, the operator must pull back on the bar. Therefore, the mower's drive is disengaged as the operator releases the control bar, but the brake is not simultaneously applied. To park the mower, the operator pulls back the bar, swings a brake lever forwardly and upwardly and wedges the brake lever against a stationary hand rest.

SUMMARY OF THE INVENTION

It is an object of the present invention to provide a steerable self-propelled mower that minimizes operator fatigue and also provides for the wheel drive control to automatically be returned to a braked configuration to prevent or stop movement of the mower when the operator is not actually engaging the drive controls.

In the preferred embodiment of the present invention a self-propelled mower is provided having a double-handled dead man control lever and separate left and right steering control levers. Left and right combination clutch and brake control levers selectively drive, disengage the clutch, and brake the respective rear wheels.

As the dead man control lever is depressed by the operator, a linkage causes the wheel drives to unbrake, then be clutched and finally driven. When this lever is released, the wheels are automatically declutched and braked.

To turn the mower during operation, the operator depresses a selected wheel steering control lever, which causes that wheel to be declutched and then braked. Provision is made in the control linkage to provide for infinitely variable braking and drive engagement consistent with the degree of lever engagement or depression provided by the operator. In this manner, the operator can brake sharply or gradually and/or drive the wheels at a slow or maximum speed. When the dead man control lever is released, the linkage allows both lever arm members to swing outwardly to brake both wheels.

BRIEF DESCRIPTION OF THE DRAWINGS

FIG. 3 is a side view of the linkage of the present invention.

FIG. 4 is a plan view of the linkage in a position corresponding to the mower being braked or parked.

FIG. 5 is a plan view of the linkage in a position corresponding to the dead man control lever being applied and both steering control levers being actuated.

DETAILED DESCRIPTION OF THE PREFERRED EMBODIMENT

The preferred embodiment of the invention will now be described in detail. References made within the following description to "left" or "right" refer to the operator's left or right as he walks behind the mower during operation.

Figure 1:
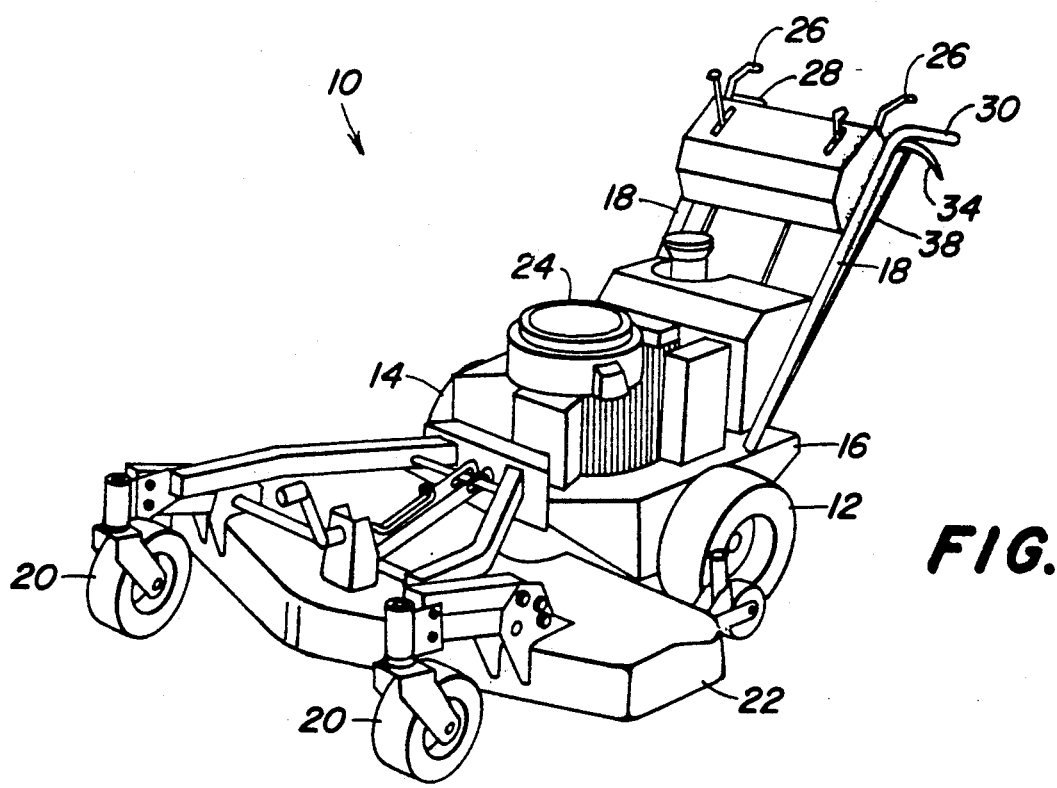
FIG. 1 is a perspective view of the left side of a mower according to the present invention.

The present invention, as shown in FIG. 1, pertains to a walk behind mower 10 having left and right rear driven wheels 12, 14 which support a frame 16, and upwardly and rearwardly extending operator handles 18. Front ground engaging caster wheels 20 support a front mower deck 22 attached to the frame 16. An engine 24 carried by the frame 16 drives a cutter blade within the mower deck 22 via a series of belts and pulleys. The engine 24 also drives the rear wheels 12, 14 via drive mechanisms referred to herein as left and right transmissions. Swingably mounted on the upper rear portion of the operator handles 18 is a double ended dead man control lever 26 (See FIGS. 1 & 2). Operator handle grips 28, 30 are formed integral with the upper ends of the operator handles 18.

Right and left steering control levers 32, 34 are swingably mounted beneath respective handle grips 28, 30. Holes 36 are defined in each steering control lever, through which pass left and right first link rods 38, 40. A nut 42 is threaded on each first link rod 38, 40 above the steering control levers 32, 34. The lower ends of the first link rods 38, 40 define a downwardly turned portion 44 pivotably received within openings 46 formed in respective left and right L-shaped bell cranks 48, 50. The bell cranks 48, 50 are rotatably fixed to the frame 16 by bolts 52. Left and right second link rods 54, 56 are swingably received within another opening 58 defined in the respective bell cranks 48, 50. These second link rods 54, 56 extend toward the center of the mower 10 and have attached a first U-shaped member 60.

Figure 2:
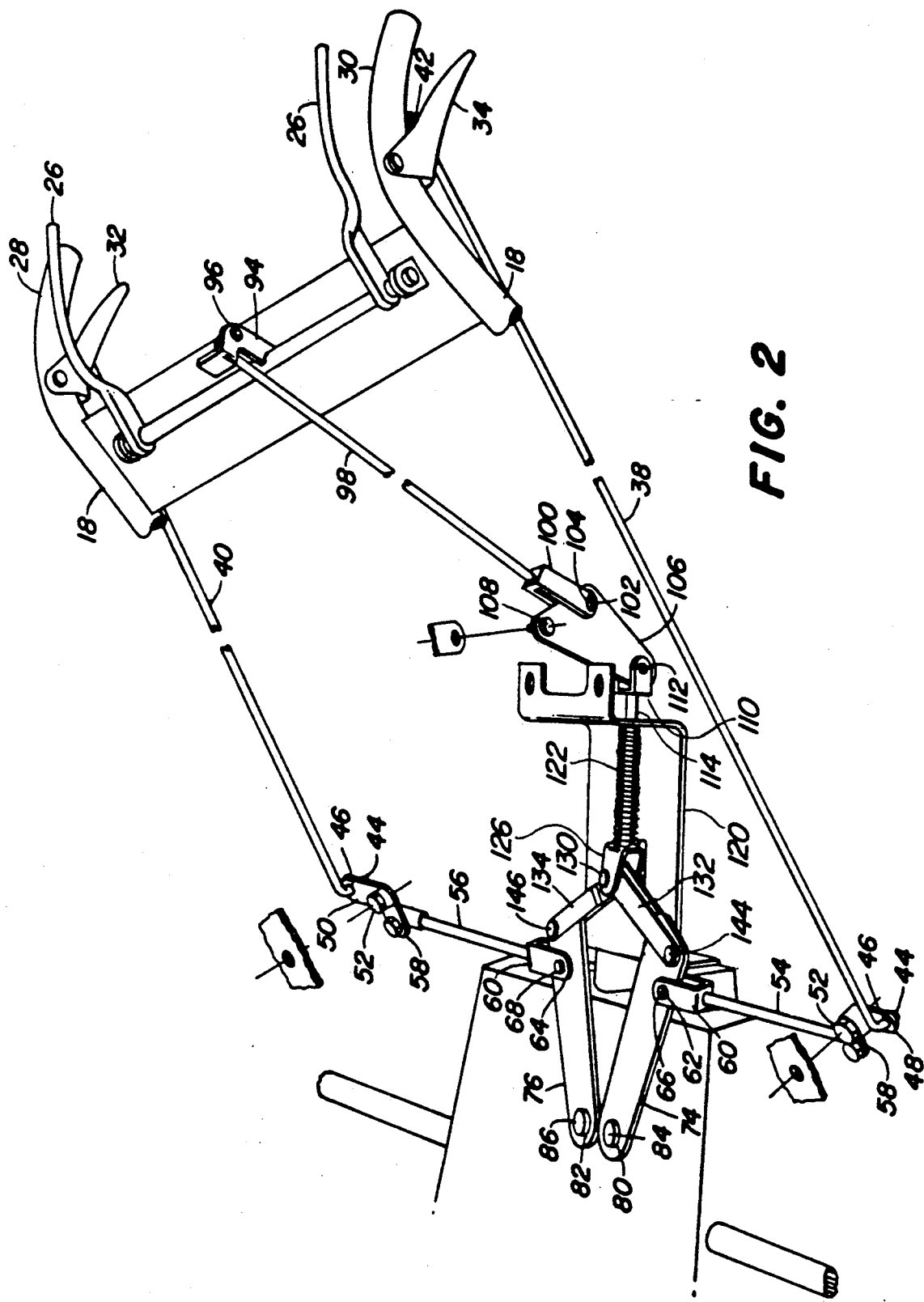
FIG. 2 is a perspective view of the operator control levers and linkage.

Looking now to FIGS. 2 & 4, there is shown first headed shafts 62, 64 which are positioned within openings 66, 68 in the ends of the first U-shaped members 60. The first headed shafts 62, 64 are received within openings 70, 72 defined in respective left and right arm members 74, 76. The first headed shafts 62, 64 are held in place within the first U-shaped members 60 and the openings 70, 72 in the arm members 74, 76 by pin members 78 positioned at the bottom of the first headed shafts 62, 64. The arm members 74, 76 each define a forward opening 80, 82 that receives a transmission mode selection input shaft 84, 86 protruding from each transmission. The transmission mode selection input shafts 84, 86 have flatted features 88, 90 that correspond to flatted features defined in the forward openings 80, 82 in the arm members 74, 76. Snap rings or similar means can be used to hold the arm members 74, 76 in place on the transmission mode selection input shafts 84, 86.

Returning to FIGS. 1 & 2, a forwardly and upwardly extending tab 94 is fixed to the center of the transverse portion of the dead man control lever 26. An opening 96 is defined in the tab 94 that receives the upper end of a center link rod 98. A second U-shaped member 100 (FIGS. 2 & 3) is threaded onto the lower end of the center link rod 98 and receives a second headed shaft 102. The second headed shaft 102 is held within a first opening 104 in a center bell crank 106. The bell crank 106 is pivotably supported by a support pin 108 held by the frame 16. A first connection member 110 is fixed to the center bell crank 106 via a third headed shaft 112. The first connection member 110 receives a center tension rod 114, and a nut 116 is threaded to the rearward end of the center tension rod 114. The center tension rod 114 passes through an opening 118 in a bracket 120, and is surrounded by a compression spring 122. The spring 122 presses against a spring retainer 124, which abuts a second connection member 126. The second connection member 126 is held in place by a nut 128 threaded on the forward end of the tension member 114. The second connection member 126 receives a headed slide pin 130 that engages the rearward ends of left and right tie members 132, 134. The lower end of the headed slide pin 130 is received within a slot 136 defined in the bracket 120. Washers 142 are positioned on the headed slide pin 130 between the second connection member 126 and the bracket 120. The forward ends of the tie members 132, 134 carry headed pins 144, 146 that are received within slots 148, 150 defined in the respective left and right arm members 74, 76, thus forming a lost motion coupling between the tie members 132, 134 and the arm members 74, 76.

The positions of the left and right transmission mode selection input shafts 84, 86 determine whether the respective rear wheel 12, 14 is in a driven, a clutch disengaged, or a braked mode, or somewhere within any of the ranges of those modes. The left and right arm members 74, 76 control the position of the transmission mode selection input shafts 84, 86. For example, when the rearward end of each arm member 74, 76 is positioned near the center of the mower 10 or closest to the centerline X—X between them, the corresponding transmission mode selection input shaft 84, or 86 is in a driven mode and the corresponding wheel is being driven by the engine 24. When the rearward end of an arm member 74, or 76 is swung away from the center line X—X of the mower 10 and to a position intermediate its range of motion, the corresponding transmission mode selection input shaft 84, or 86 is put in a clutch disengaged mode such that the wheel is allowed to roll freely on the ground. As the arm member 74, 76 approaches its extreme outward position moved away from the centerline X—X, the corresponding transmission mode selection input shaft 84, or 86 is placed in its braked mode. In the braked mode the wheel's clutch remains disengaged and a brake is applied to slow the wheel's rotation. A spring can be provided internal to each transmission to bias each transmission mode selection input shaft 84, 86 toward its driven mode. Alternatively, other biasing means such as a spring can be provided external to the transmissions to urge the tie members 132, 134 toward each other.

Next, the operation of the mower will be explained. Once the engine 24 is started, the operator initiates forward progress of the mower 10 by pressing down the dead man control lever 26. This causes the tab 94 (FIG. 2) to swing upward, which pulls the center link rod 98 upward. The center bell crank 106 is thereby rotated backward and upward about its pivot axis through pin 108. The first connection member 110, center tension rod 114, and second connection member 126 thereby move rearwardly against the force of the compression spring 122. This causes the headed slide pin 130 to move rearwardly within the slot 136 defined in the bracket 120. The headed slide pin 130 pulls back on the rearward end of the tie members 132, 134, and the arm members 74, 76 are thereby allowed to swing toward each other to the center of the mower 10 due to the force of the springs internal to the transmissions. The transmission mode selection input shafts 84, 86 are thereby caused to rotate into their respective driving modes, and the wheels 12, 14 become driven.

Once the mower 10 begins to move forward in the above described manner, the operator can change the direction of travel by engaging one of the steering control levers 32, 34. When the right steering lever 32 is depressed, for example, the right first link rod 40 moves upward, causing the right bell crank 50 to rotate and pull the second right link rod 56 outwardly from the center of the mower. The second right link rod 56 pulls the right arm member 76 outward to the right, which causes the right headed pin 146 to slide within the slot 150 defined in the right arm member 76. The right tie member 134 remains stationary as the right second link rod 56 pulls the right arm member 76 outwardly, and the headed slide pin 130 therefore also remains stationary. Since the headed slide pin 130 has not moved, the left tie member 132, left arm member 74, and left transmission mode selection input shaft 84 remain stationary. Therefore, the slot 150 formed in the right arm member 76 allows the right arm member 76 to be moved outwardly without altering the position of the left arm member 74. As the right arm member 76 swings outward the right transmission mode selection input shaft 86 changes from driven, to clutch disengaged, to braked mode. The right wheel 14 is thereby braked while the left wheel 12 remains driven, causing the mower to turn about its right wheel 14. As the operator depresses the left steering control lever 34, the mower 10 similarly executes a turn to the left.

In order to slow or stop the mower 10, the operator can depress both steering levers 32, 34 at once, which causes both arm members 74, 76 to sWing outWardly. Both rear wheels 12, 14 are thereby braked, and the mower 10 comes to a halt. The operator can also release the dead man control arm 26 to stop the mower 10. This allows the center link rod 98 to move downwardly due to the force of the spring 122, which causes the center tension rod 114 to move forward and the headed slide pin 130 to slide forward in the slot 136 formed in the bracket 120. The left and right arm members 74, 76 are thereby caused to swing outwardly to disengage each clutch and brake both wheels 12, 14.

The steering control levers 32, 34 and dead man control lever 26 of the preferred embodiment can be positioned by the operator in an infinite number of intermediate positions between the fully released and fully depressed positions. Each transmission can similarly assume an infinite number of modes between the braked mode, the disengaged mode, and the driven mode as the operator manipulates the control levers 26, 32, 34. The operator is thereby able to select the exact forward speed that he desires as well as the exact turning radius he desires. This feature also allows the operator to gradually change the speed of the mower 10 or gradually change the turning radius by slowly manipulating the controls 26, 32, 34 through their continuum of positions.

When the operator leaves the operator station, he releases the dead man control lever 26, which will disengage the clutches that drive the wheels 12, 14 and will apply a brake to both wheels 12, 14.

FIGS. 4–7 depict the various configurations the linkage can assume during operation. FIG. 4 shows the configuration of the linkage when the mower 10 is in a braked or parked mode, which corresponds to the dead man control lever 26 being released and both steering control levers 32, 34 being released. The spring 122 has urged the headed slide pin 130 forwardly within the slot 136, which swings the tie members 132, 134 away from each other. This causes the headed pins 144, 146 to move away from the center of the mower 10, line X—X, which places the arm members 74, 76 in an extreme position outwardly of the center of the mower 10. The outward position of the arm members 74, 76 corresponds to the transmission input shafts' braked modes.

Figure 6:
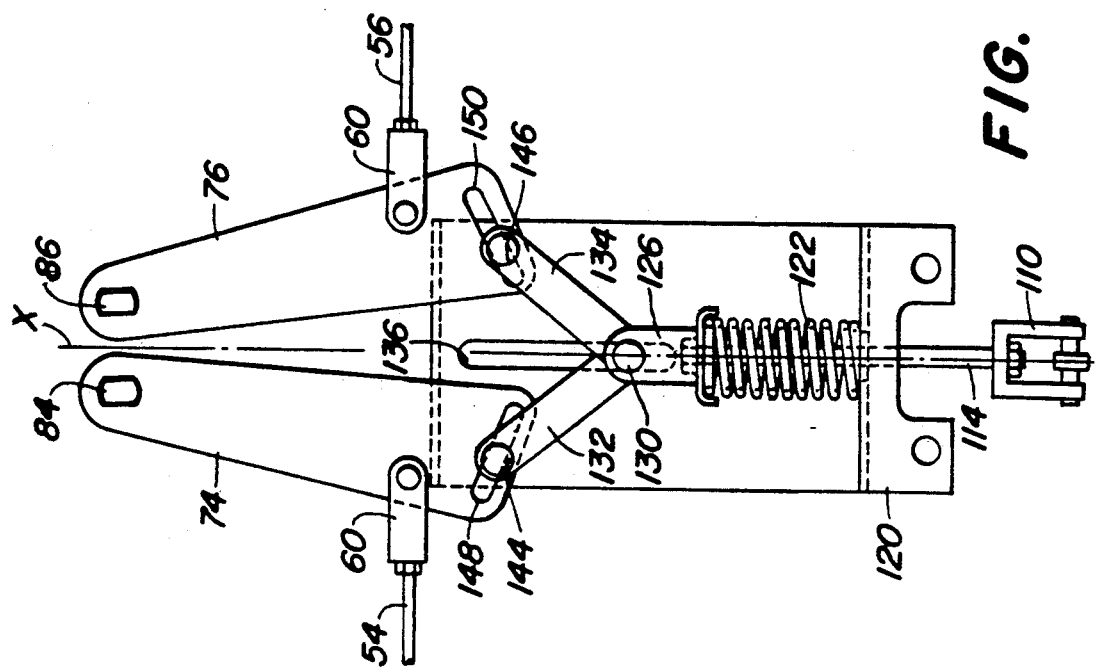
FIG. 6 is a plan view of the linkage in a position corresponding to straight forward movement of the mower.

FIG. 6 depicts the configuration corresponding to straight forward movement of the mower 10. In this case, the dead man control lever 26 has been engaged, which pulls back on the center tension rod 114 against the force of the spring 122. This moves the headed slide pin 130 rearwardly within the slot 136 and allows the tie members 132, 134 and arm members 74, 76 to be swung toward the center of the mower due to the force of the spring internal to each transmission. As the dead man control lever 26 is engaged, the arm members 74, 76 are caused to swing inwardly to an extreme position, at which point the dead man control lever 26 can still be pushed down further by the operator. This causes the headed pins 144, 146 to shift within the slots 148, 150 away from the outer edge of the slot 148, 150 to an intermediate position as shown in FIG. 6.

FIG. 5 shows the configuration assumed by the linkage when the dead man control lever 26 is fully depressed and both steering control levers 32, 34 are actuated. The center tension rod 114 and headed slide pin 130 are in extreme rearward positions. The second link rods 54, 56 have been pulled outwardly due to the engagement of the steering control levers 32, 34. This causes the arm members 74, 76 to swing outward to a braked position. The slots 148, 150 in the arm members allow the arm members to swing outwardly without altering the positions of the headed pins 144, 146 or the headed slide pin 130.

Figure 7:
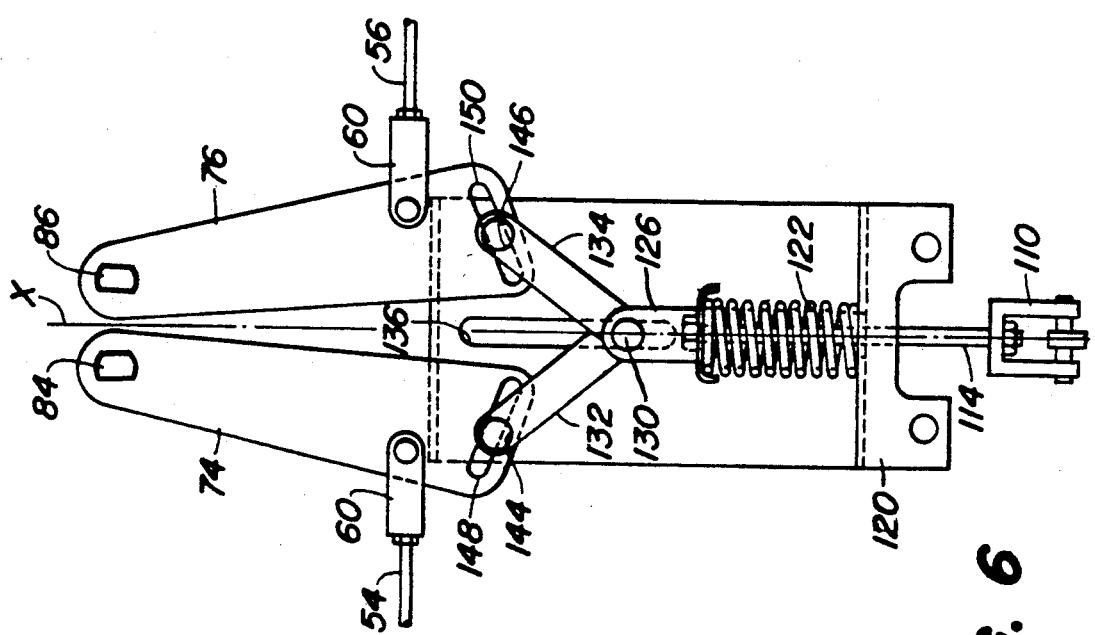
FIG. 7 is a plan view of the linkage in a position corresponding to the execution of a right turn by the mower.

FIG. 7 shows the configuration of the linkage as the mower is executing a turn to the right. The dead man control lever 26 is fully engaged and the center tension rod 114 and headed slide pin 130 are therefore in an extreme rearward position. The right steering control lever 32 is actuated, which causes the second right link rod 56 to pull the right arm member 76 outwardly. The slot 150 in the right arm member 76 allows the right arm member 76 to swing outward without altering the position of the headed pins 144, 146 or the headed slide pin 130. The right arm member 76 and transmission input shaft 86 can thereby be manipulated independent of the left arm member 74 and transmission input shaft 84. In this manner, the mower 10 can execute turns during operation.

The present invention therefore provides a direct drive self-propelled walk behind mower that is steerable and that includes a safety feature that brakes the mower when the operator leaves the operator station. The mower is normally in a braked, parked state. Further, operator fatigue is minimized since the dead man control lever can easily be held down with either or both of the operator's hands.

The preferred embodiment as described above pertains to a mower having gear driven rear wheels, and having driven, clutch disengaged, and braked modes. However, the present invention can also be utilized on belt driven and hydrostatically driven mowers, as well as mowers having only driven and braked modes.

I claim:

1. A mower comprising:
   at least one ground engaging wheel;
   left and right ground engaging driven wheels fore and aft offset from said one wheel;
   a frame carried by the wheels;
   a power source carried by the frame;
   first and second transmission means that independently transmit power from the power source to the left and right ground engaging driven wheels respectively, each transmission having driving and braking modes;
   rearwardly and upwardly extending operator handles carried by the frame;
   a dead man control lever means carried by the operator handles;
   first and second steering lever means carried by the operator handles;
   a linkage means operatively interconnecting the dead man control lever means, the steering lever means and the transmission means for changing both transmission means from the braked mode to the driving mode as the dead man control lever means is actuated, and for changing the first or second transmission means from the drive mode to the brake mode as the respective steering lever means is actuated when the dead man control lever means is depressed, and for changing both transmissions to the braked mode as the dead man control lever means is deactuated.

2. The invention as described in claim 1, wherein:
   each transmission means has a clutch engaged mode, a clutch disengaged mode, and a brake mode; and
   the linkage means operatively interconnects the dead man control lever means, the steering lever means and the transmission means such that as the dead man control lever means is actuated both transmissions change from the braked mode to the clutch disengaged mode to the clutch engaged mode, and such that when the dead man control lever means is actuated the first and second transmission modes are adjustable by manipulation of the respective steering lever means, and such that both transmissions are changed to the braked mode as the dead man control lever means is deactuated.

3. A mower comprising:
   at least one ground engaging wheel;
   left and right ground engaging driven wheels fore and aft offset from said one wheel;
   a frame carried by the wheels;
   rearwardly and upwardly extending support means carried by the frame;
   a power source carried by the frame;
   a dead man control lever means carried by the support means;
   first and second steering lever means carried by the support means;
   first and second transmission means that independently transmit power from the power source to the left and right wheels, each of said transmission means adapted to wheel driving or brake modes;
   first and second input means coupled respectively with the left and right transmission means, for selecting power or brake modes of its respective transmission means; and
   means operatively interconnecting the first and second input means, the dead man control lever means, and each of the steering control lever means, for causing the input means to select the power or brake modes as the dead man control lever means is shifted between first and second positions respectively, and for causing the first and second input means to move from the power mode to the brake mode when said respective steering control lever means has been actuated and the dead man control lever means is in the first position;
   and means for biasing the dead man control lever means toward its second position.

4. The invention according to claim 3 wherein:
   the dead man control lever means, the first and second steering lever means, the interconnecting means, and the input means are shiftable to a continuum of positions between their respective first and second positions, said continuum of positions corresponding to a continuum of transmission means modes provided between the drive and brake modes respectively.

5. The invention according to claim 3 wherein:
   the transmission means is adapted to operate in a continuum of modes between its wheel driving and brake modes;
   the first and second input means are adapted to operatively select their respective transmission means' mode;
   the interconnecting means causes the input means to select a particular mode between the power and brake mode as the dead man control lever means is shifted between first and second positions respectively, and causes the input means to move from the mode effected by the dead man control lever means through a continuum of modes toward the brake mode as said left or right steering control lever means is actuated;
   and means for biasing the dead man control lever means toward its second position.

6. The invention according to claim 3 wherein:
   the transmission means are adapted for wheel driving, disengaged, or braked modes;
   the first and second input means are coupled respectively with the left and right transmission means, for selecting wheel driving, disengaged or braked modes of its respective transmission means;
   the means operatively interconnecting the first and second input means, the dead man control lever means, and each of the steering control lever means causes the input means to select the wheel driving, disengaged, or braked modes as the dead man control lever means is shifted between first, second, or third positions respectively, and causes the input means to move from the mode effected by the dead man control lever means to another mode toward the brake mode as said respective steering control lever means has been actuated; and means is provided for biasing the dead man control lever means toward its third position.

7. The invention defined in claim 3 wherein:
the dead man control lever means, the first and second steering lever means, the interconnecting means, and the input means are shiftable to first, second, and third positions corresponding to driving, disengaged, and brake modes respectively, of the transmission means.

8. The invention defined in claim 3 wherein:
the dead man control lever means, the first and second steering lever means, the interconnecting means, and the input means are shiftable to a continuum or positions between first, second, and third positions corresponding to a continuum of transmission means modes between a driving, a disengaged, and a brake modes respectively.

9. The invention defined in claim 3 wherein:
the transmission means is adapted to occupy a continuum of modes between wheel driving, disengaged, and brake modes;

the first and second input means are adapted to operatively select the particular mode of their respective transmission means;

the interconnecting means is adapted to shift the input means to a particular mode between the driving, disengaged or brake mode as the dead man control lever means is shifted between first, second and third positions respectively, and is adapted to move the respective input means from the mode effected by the dead man control lever means through a continuum of modes toward the brake mode as said first and second steering lever means is actuated; and means is provided for biasing the dead man control lever means toward its second position.

10. A mower comprising:
at least one ground engaging wheel;
left and right ground engaging driven wheels fore and aft spaced from the one wheel;
a frame carried by the wheels;
rearwardly and upwardly extending support means carried by the frame;
a dead man control lever means carried by the support means;
left and right steering lever means carried by the support means;
a power source carried by the frame;
first and second transmission means that independently transmit power from the power source to left and right wheels, each of said transmission means adapted for wheel driving or braking modes;
first and second input means coupled respectively with the left and right transmission means, for selecting power or brake modes of its respective transmission means;
a first linkage means operatively connecting the dead man control lever means to each input means for causing the input means to select the power or brake modes respectively as the dead man control lever means is shifted between first and second positions respectively;

second and third linkage means operatively connecting the left and right steering control lever means to the input means for causing the input means to move from the drive mode to the brake mode when said respective left or right steering control lever means has been actuated and the dead man control lever means is in the first position;

and means for biasing the dead man control lever means toward its second position.

11. The invention according to claim 10 wherein:
the first linkage comprises:
first and second arm members each operatively coupled with the input means opening;
first and second tie member means each being connected to respective arm members by a lost motion coupling;
a bracket means carried by the frame and including a slot;
a slide pin means coupled with both tie member means and being slidably received in the bracket slot;
a tension rod operatively fixed at one end to the slide pin;
a spring means that biases the slide pin within the bracket slot;
a link rod means operatively connecting the tension rod to the dead man control lever.

12. The invention according to claim 11 wherein:
the second and third linkages each include:
a first link rod means operatively connected to a respective steering control lever;
a bell crank means swingably fixed to the frame and operatively connected to the first link rod means;
a second link rod means operatively connected to the bell crank means and operatively coupled with a respective arm member.

13. A mower having:
a frame;
a power source;
left and right ground engaging drive wheels;
first and second transmission means that independently transmit power from the power source to the left and right wheels respectively, each of said transmission means being adapted to be shifted between wheel driving and braking modes;
first and second input means coupled respectively with the left and right transmission means, for shifting its respective transmission means between its driving and braking modes;
first wheel control means coupled with both input means, said control means movable between first and second positions and being operative in the first position to cause the two input means to simultaneously occupy a driving mode and operative in the second position to cause both input means to simultaneously occupy the braking mode;
means urging the first wheel control means towards its second position; and
left and right wheel control means coupled with the first and second input means respectively and effective to shift the first or second transmission means to a braking mode when the first wheel control means is in its first position.

14. The invention defined in claim 13 wherein:
the input means, first wheel control means, and left and right wheel control means are shiftable in a continuum of positions corresponding to a continuum of transmission means modes between and including the driving mode and brake mode.

15. The invention defined in claim 13 wherein:
the input means, first wheel control means, and left and right wheel control means are shiftable to first, second, and third positions corresponding to drive, disengaged, and brake modes respectively, of the transmission means.

16. The invention defined in claim 13 wherein:
the input means, first wheel control means, and left and right wheel control means are shiftable to a continuum of positions between first, second, and third positions corresponding to a continuum of transmission means modes between the drive, disengaged, and brake modes respectively.

17. The invention defined in claim 13 wherein the first and second input means includes first and second lever arms with each lever arm being movable between first and second positions, the first position corresponding to the transmission means driving mode and the second position corresponding to the transmission means braking mode.

18. The invention defined in claim 17 wherein each lever arm is connected to the first wheel control means to permit both lever arms to be moved to their first position as the first wheel control means is moved to its first position.

19. The invention defined in claim 18 wherein the left and right wheel control means are connected to the first and second lever arms respectively and lost motion means is provided between the first wheel control means and each lever arm to permit the left and right wheel control means to shift the lever arm and the left and right transmission means to their braking modes when the first wheel control means is in its first position.

20. The invention defined in claim 19 further including means urging the first and second lever arms towards their first position.

21. The invention defined in claim 19 wherein the lost motion means includes a slot on each lever arm and the first wheel control means includes first and second pins engageable within a respective slot.

22. The invention defined in claim 19 wherein the first wheel control means includes a member reciprocal along a guide means, first and second links are coupled at their adjacent ends with the reciprocable member and also coupled by lost motion connections to the first and second lever arms respectively.

* * * * *

UNITED STATES PATENT AND TRADEMARK OFFICE
CERTIFICATE OF CORRECTION

PATENT NO.   :   5,020,308

DATED        :   4 June 1991

INVENTOR(S)  :   Stephen A. Braun et al.

It is certified that error appears in the above-identified patent and that said Letters Patent is hereby corrected as shown below:

Column 9, line 38, delete "and" and insert -- or -- .

Signed and Sealed this

Third Day of November, 1992

Attest:

DOUGLAS B. COMER

Attesting Officer

Acting Commissioner of Patents and Trademarks